United States Patent [19]

Huynh et al.

[11] Patent Number: 5,349,461
[45] Date of Patent: Sep. 20, 1994

[54] SIMULTANEOUS BIDIRECTIONAL DIGITAL DATA TRANSMISSION OVER A SINGLE LINE AT A COMMON FREQUENCY ON AN OPTICAL WAVEGUIDE

[75] Inventors: Hon Huynh; Jörg Franzke; Harald Lilienthal; Peter Bresche, all of Berlin, Fed. Rep. of Germany

[73] Assignee: Krone AG, Beeskowdamm, Fed. Rep. of Germany

[21] Appl. No.: 918,675

[22] Filed: Jul. 22, 1992

[30] Foreign Application Priority Data

Jul. 26, 1991 [DE] Fed. Rep. of Germany ....... 4125105

[51] Int. Cl.⁵ .............................................. H04L 7/00
[52] U.S. Cl. ..................................... 359/152; 359/158; 359/184; 359/136; 370/29
[58] Field of Search ............... 359/152, 158, 187, 135, 359/136, 140, 173, 184, 186, 188; 375/106, 109, 122; 371/41, 47.1, 61, 62; 370/29, 95.3, 32, 29, 109; 341/178, 182

[56] References Cited

U.S. PATENT DOCUMENTS

| 3,742,199 | 6/1973 | Lubarsky | 235/154 |
| 4,751,701 | 6/1988 | Roos et al. | 359/158 |
| 5,046,063 | 9/1991 | Lagess | 370/29 |
| 5,182,762 | 1/1993 | Shirai et al. | 375/122 |
| 5,252,977 | 10/1993 | Lueker et al. | 341/178 |

Primary Examiner—Richard E. Chilcot, Jr.
Assistant Examiner—Richard Moller
Attorney, Agent, or Firm—McGlew and Tuttle

[57] ABSTRACT

The invention relates to a method for the digital, bidirectional data transmission on an optical waveguide. For either direction of the data transmission, light pulses having the same frequency are used. The pulses to be transmitted are reduced from an original width $T_b$ to a width $T_r$, the pulse-to-pause ratio $T_r/(T_b - T_r)$ having to be smaller than one. The second transmitter/receiver unit is allowed to transmit during a reception pause $(T_b - T_r)$ only. In order to achieve an optimum distribution of the optical pulses on the optical waveguide 3, the first transmitter/receiver unit 1 measures the timing on the optical waveguide 3 and causes, if required, by a modify signal, the second transmitter/receiver unit 2 to a modified transmission time of its optical signals. Thereby, a control loop is established, automatically achieving an optimum pulse distribution on the optical waveguide, within certain limits (FIG. 3).

16 Claims, 2 Drawing Sheets

SIMULTANEOUS BIDIRECTIONAL DIGITAL DATA TRANSMISSION OVER A SINGLE LINE AT A COMMON FREQUENCY ON AN OPTICAL WAVEGUIDE

FIELD OF THE INVENTION

The invention relates to a method and a device for digital, bidirectional data transmission on an optical waveguide, the optical waveguide connecting two transmitter/receiver units with one another.

BACKGROUND OF THE INVENTION

The simplest prior art method of a bidirectional data transmission over optical waveguides includes a separate optical waveguide for each direction of transmission. This method has proven disadvantageous based on the high cost for long-distance communications, due to the employment and laying of one optical waveguide for each direction of transmission.

Further, there is known in the art a wavelength division multiplexing method, wherein different wavelengths or frequencies, resp., are used for each direction of transmission. A wavelength $\lambda_1 = 1,300$ nm can be used, e.g., for the one direction, and $\lambda_2 = 1,550$ nm for the other direction. By using different wavelengths of the transmitting light, the transmission of both directions can be performed on a single optical waveguide. Each of the two transmitter/receiver units must include a wavelength-selective component (multiplexer), being used for the separation of the two wavelengths. If the difference of the two wavelengths $\Delta\lambda = \lambda_2 - \lambda_1$ is within the bandwidth of the sensitivity of the employed optical receivers, it is not necessary to discriminate between the two wavelengths in the optical receiver. It is disadvantageous, herein, that the wavelength-selective elements have to provide a high selectivity or attenuation, resp., such that only very good multiplexers having a high wavelength isolation can be used. These are very expensive. Moreover, proper communication over long distances will require an attenuation of at least 50 db between the two channels, in order to avoid cross-talk between the channels.

Another prior art method is the packet-switched data transmission, wherein, over a single optical waveguide, alternatingly for both directions, the data are transmitted in the form of packets. At the beginning and at the end of each packet, start or stop information for control and monitoring of the transmission is inserted. After the stop information being received and evaluated at the actual receiver side, the transmitter can, in the opposite direction of the transmission path, transmit its data as a packet being also provided with start and stop information. It has to be considered, therein, that a long pause is to be maintained between two packets, which has, due to the transmission time, to be at least as long as the transit time over the transmission path. It is disadvantageous, herein, that due to the long pauses, the transmission path cannot be utilized in an optimum manner. Moreover, the packet-switched transmission method requires an expensive clock recovery, large data rates and a complicated control system. Depending on the length of the packets, a large memory may also be necessary.

SUMMARY AND OBJECTS OF THE INVENTION

The invention is based on the object, therefore, to provide a simple and economic method for the optical, bidirectional data transmission on an optical waveguide, which operates on one light frequency only and which avoids the prior disadvantages.

According to the invention, transmission of the data flow for either direction is performed simultaneously, the same light wavelength being applied for either direction. In order to avoid the problem of decoupling of transmitter and receiver of the same transmitter/receiver unit, which occurs when using optical signals of the same wavelengths for the bidirectional transmission on an optical waveguide, the original pulse width $T_b$ of the signals to be transmitted is reduced, for the optical transmission, to a smaller pulse width $T_r$. This corresponds to a RZ (return to zero) coding, the pulse-to-pause ratio $T_r/(T_b - T_r)$ being, according to the invention, smaller than one. This pulse-width-reduced signal of the length $T_r$ is transmitted, over the optical waveguides, from the first to the second transmitter/receiver unit and is fed there to a second receiver. Then, a pulse-width correction is performed, so that the data pulse again receives its original width $T_b$. Thereby, at the second transmitter/receiver unit, a reception pause $(T_b - T_r)$ results, which can be used, by the second transmitter, for transmitting a pulse reduced to the pulse width $T_r$, in the direction of the first transmitter/receiver unit. The second transmitter transmits, therefore, only in the so-called reception pause $(T_b - T_r)$.

For certain light wavelengths, this will lead, at the first receiver, to an optimum timing between the signals of the two transmitter/receiver units. For other transmission lengths of the optical waveguides, there is a possibility that the signals from the first and second transmitters will superimpose each other, so that crosstalk will result.

In order to avoid this, the first transmitter/receiver unit monitors the pulse timing on the optical waveguide, and causes, if necessary, the second transmitter/receiver unit, by means of a modify signal, to change its transmission time within the reception pause. This modification of the transmission time at the second transmitter is made, until an optimum timing between the signals of the two transmitters is achieved at the first transmitter/receiver unit. We have here, therefore, a feedback control loop. The transmission of the modify signal can be performed at any place within the data flow, or it can be provided, for the transmission, an own time slot.

Further advantageous embodiments of the invention can be found in the subclaims.

For instance, the receiver-side data processing is stopped in a transmitter/receiver unit, if the respective transmitter transmits an optical signal. Thereby, crosstalk is avoided.

The decision, whether or not a signal timing is favorable, can be performed by a measurement of the bit and/or code error of the transmission.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
FIG. 1 is a schematic block diagram of a bidirectional data transmission on an optical waveguide according to the invention.

Referring now to FIG. 1, there is shown the connection between a first transmitter/receiver unit 1 with a second transmitter/receiver unit 2 through an optical waveguide 3. Data transmission takes place simultaneously in either direction, i.e. bidirectional data transmission. The frequency employed for the optical transmission pulses is identical for either direction.

Figure 2:
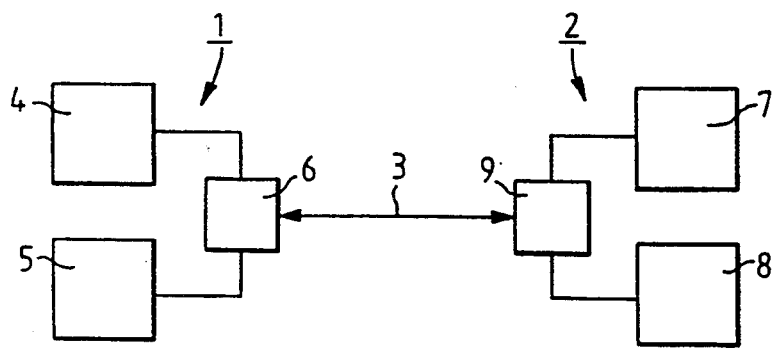
FIG. 2 is a more detailed block diagram of a bidirectional data transmission according to the invention.

FIG. 2 shows the fundamental construction of the transmitter/receiver units 1, 2 in greater detail. The transmitter/receiver unit 1 comprises a first transmitter unit 4 and a first receiver unit 5. By means of a first coupling element 6, data from the first transmitter unit 4 are transferred to the optical waveguide 3, or data from the optical waveguide 3 are conducted into the receiver unit 5. The second transmitter/receiver unit 2 comprises analogous components, second receiver unit 7, second transmitter unit 8 and an optical coupling element 9 for coupling data into or out from the optical waveguide 3, resp.

Figure 3:
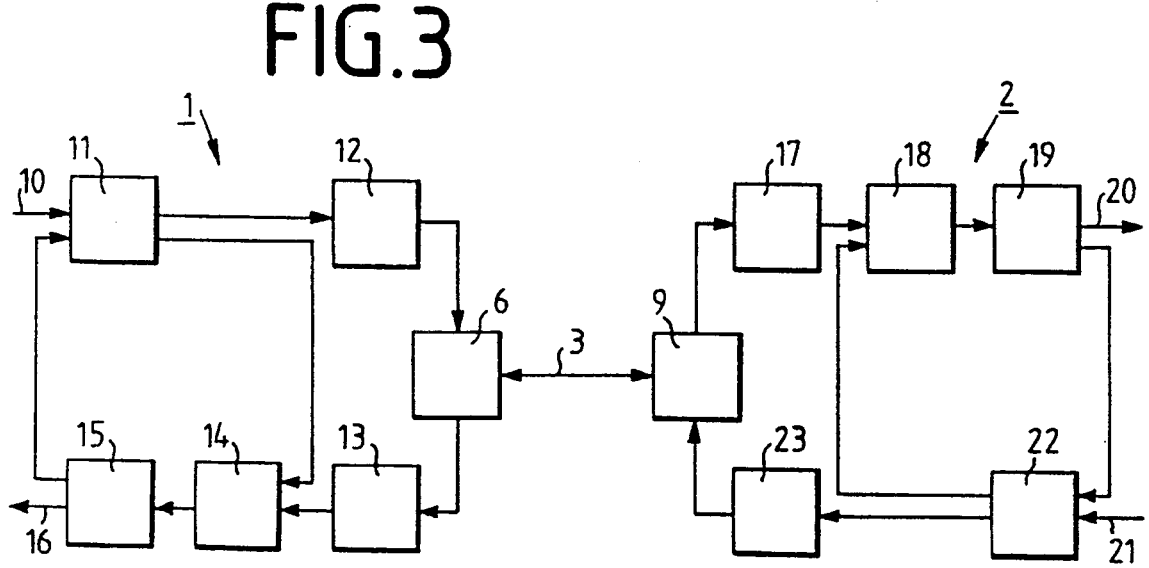
FIG. 3 is a block diagram of the device according to the invention, together with the components thereof.

A block diagram of a preferred embodiment for implementing the method according to the invention is shown in FIG. 3. On either side of the optical waveguide 3, there are provided the transmitter/receiver units 1 and 2. The first transmitter unit 1 comprises a data input or stream 10, conducting the digital data to be transmitted into a data editing unit 11. The digital data conducted by data input 10 has a pulse width $T_b$. In the data editing unit 11, the pulse width is reduced from the original width $T_b$ to the reduced width $T_r$. These width-reduced pulses are fed to a first optical transmitter 12 generating optical transmission pulses having the length $T_r$, corresponding to the electrical pulses. By means of the optical coupling element 6, the optical transmission pulses are transferred to the optical waveguide 3. Optical pulses coming from the second transmitter/receiver unit 2 are conducted, by the optical coupling element 6, into an optical receiver 13 and are transformed, therein, into electrical signals having the pulse widths $T_r$, corresponding to the electrical pulses. The transformed pulses arrive at a pulse-width correction unit 14, widening the pulses back to their original pulse widths $T_b$. To the pulse-width correction unit 14 there is separately fed the output signal of the data editing unit 11, so that when the optical transmitter 12 transmits with the pulse duration $T_r$, the pulse-width correction unit 14 has its input of transformed pulses blocked or the entire pulse-width correction unit 14 is switched off. The output signal of the data editing unit 11 fed to the pulse-width correction unit 14 is actually a control signal of the data editing unit 11, which is electrically identical to the output signal of the data editing unit 11 to the optical transmitter 12. The pulse-width correction unit 14 is controlled by this control signal so that at times when the optical transmitter 12 transmits the pulse duration $T_r$, the input signal of the pulse-width correction unit 14 is masked. Thereby, crosstalk between outgoing optical signals of the transmitter/receiver unit 1 and any incoming signals of the transmitter/receiver unit 2 is avoided. The pulse-width-corrected data arrive at a bit-code error measurement unit 15, serving for detecting an unfavorable timing between the transmitted and received optical signals. If the measurement yields a positive result, the result is transferred, over a connection of the bit-code error measurement unit 15 with the data editing unit 11 and the coupling element 6, to the optical waveguide 3 and received by the second transmitter/receiver unit 2, effecting a modification of the time behavior of the second transmitter/receiver unit 2.

The second transmitter/receiver unit 2 comprises an optical coupler 9, coupling the optical signals of the optical waveguide 3 in or out, respectively. Incoming optical signals are supplied from the optical coupling element 9 to an optical receiver 17, transforming the optical signals having the lengths $T_r$ into signals (electrical) having identical lengths. The transformed signals are fed to a pulse-width correction unit 18, widening the pulses back to their original lengths $T_b$. The subsequent control signal output unit 19 serves for separating control signals from the data flow, in particular the modify signal. Valid data are fed to the data output 20. The recognized control signals are supplied to the data editing unit 22, together with the data input 21. The data editing unit 22 modifies, depending on the control signals of the control signal output unit 19, the signal timing, i.e. the time of transmitting a signal in the reception pause, and reduces the pulse width of the data from the original width $T_b$ to $T_r$. The electrical signals are fed, on one hand, to an optical transmitter 23, performing an electro-optical transformation of the signals, and simultaneously, the transmission signal is fed to the pulse-width correction unit 18. During transmission of a signal, therefore, the input of the transformed signals to the pulse-width correction unit 18 is blocked or masked, so that crosstalk of the two optical transmitters is avoided. The optical coupler 9 couples the transmission signal onto the optical waveguide 3.

Figure 4:
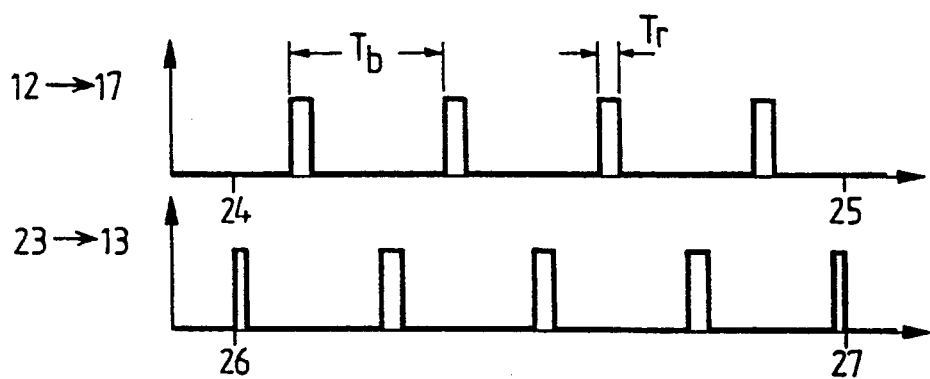
FIG. 4 is a pulse distribution diagram for an optimum distribution of the signals.

FIG. 4 shows an optimum distribution of the optical signals, i.e. optimum timing, on the optical waveguide 3. Horizontally, the glass-fiber length, and vertically, the pulse amplitude are shown. The distribution is represented for an arbitrary, but fixed time $T = T_1$. The upper portion of FIG. 4 contains the direction of the transmitter/receiver unit 1 to the transmitter/receiver unit 2, whilst the lower portion contains the opposite direction. On the upper horizontal axis, 24 marks the location of the optical transmitter 12, and 25 marks the location of the optical receiver 17, on the optical waveguide 3. In an analogous manner, on the lower horizontal axis, 26 marks the location of the optical receiver 13, and 27 marks the location of the optical transmitter 23, on the optical waveguide 3. The pulses have reduced widths $T_r$. The original pulse width $T_b$ is given, in FIG. 4, by the spacing of the first leading edge of a pulse to the leading edge of the following pulse. An optimum signal distribution is achieved, when the pulse in the return direction, here shown by the lower portion of FIG. 4 is approximately in the middle of the reception pause $(T_b - T_r)$.

Figure 5:
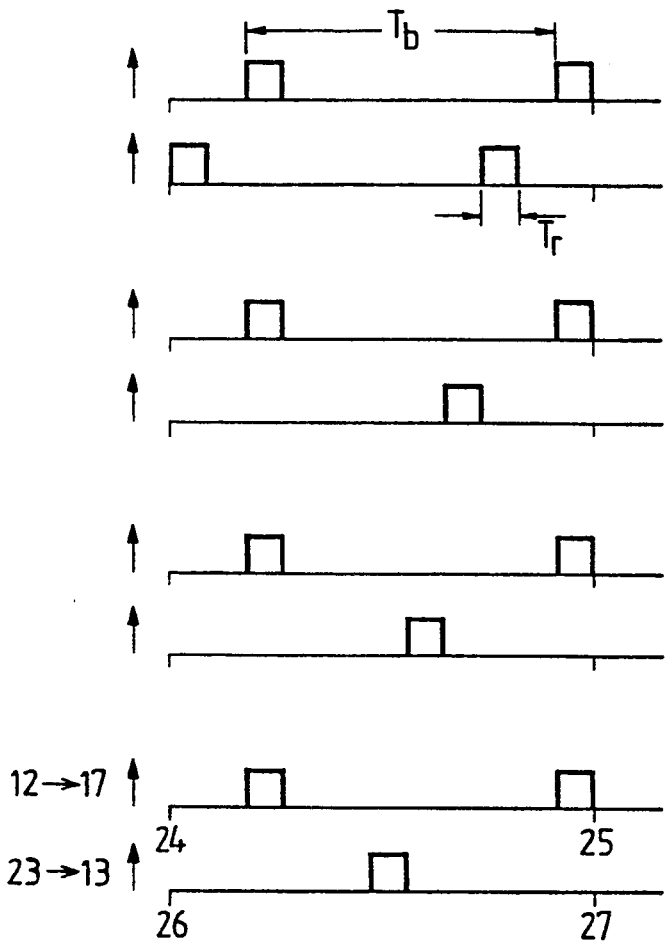
FIG. 5 is a pulse distribution diagram for different transmission times of the return pulse.

FIG. 5 shows schematically, how the optical pulse outgoing from the transmitter/receiver unit 1 can be displaced in time relative to a pulse of the direction transmitter/receiver unit 1 to transmitter/receiver unit 2. In the horizontal direction there is displayed the glass-fiber length, and in the vertical direction the pulse amplitude. Each upper portion of the four diagrams is the transfer direction from the first optical transmitter 12 to the second optical receiver 17, and each lower portion the transfer direction from the second optical transmitter 23 to the first optical receiver 13. On the horizontal axes are further shown the location of the optical transmitter 24, the location of the second optical receiver 25, the location of the first optical receiver 26 and the location of the second optical transmitter 27. The situation in the direction of transmission 12 to 17 is identical on all four diagrams, namely that at the location of the second optical receiver 25, the leading edge of an optical transmission pulse $T_r$ just occurs. The spacing between the two leading edges of the shown transmission pulses is the original pulse width $T_b$, as in FIG. 4. The lower portions of the four diagrams each show that due to the "modify signal", the location of the return pulses with respect to time and thus also with respect to location is relatively displaced. Between the transmitter/receiver unit 1 and the transmitter/receiver unit 2, there is a master-slave relationship, i.e. the master (transmitter/receiver unit 1) decides, whether or not the timing behavior of the optical pulses on the optical waveguide 3 is favorable in either direction, and causes the slave (transmitter/receiver unit 2), by a modify signal, to modify the time of its transmitted optical signal in the reception pause ($T_b-T_r$). The decision, whether a timing is favorable or unfavorable, is performed by a bitcode error examination. Therefore, a control loop is established, wherein the timing is modified, until the measurement at the transmitter/receiver unit 1 delivers an optimum timing of the transmission pulses (the bit code error measurement unit 15 generates a modify signal which is fed to the data editing unit 11 and which is transmitted either at an arbitrary location or at a particular time slot, this modify signal is then received at control signal output unit 19 which generates the control signal in response to the "modify signal" which control signal is then sent to editing unit 22 for adjusting the time of the transmission).

While a specific embodiment of the invention has been shown and described in detail to illustrate the application of the principles of the invention, it will be understood that the invention may be embodied otherwise without departing from such principles.

What is claimed is:

1. A device for bidirectional digital data transmission on an optical waveguide comprising: a first transmitter/receiver unit connected to a second transmitter/receiver unit by the optical waveguide, said first transmitter/receiver unit comprising:

data input means for inputting a data signal in electrical form, said data signal having a pulse width $T_b$;

data editing means for reducing a pulse width of said signal received from said data input to generate an output with a pulse width $T_r$ and a reception pause having a width $T_b-T_r$;

optical transmitter means for receiving said signal of a pulse width $T_r$ and generating an optical signal having a pulse width $T_r$;

an optical coupling element for coupling said optical signal of a pulse width $T_r$ to said optical waveguide;

an optical receiver connected to said coupling element, said optical receiver for receiving optical signals of a pulse width $T_r$ and generating electrical signals of a pulse $T_r$;

pulse-width correction means for receiving electrical signals from said optical receiver of a pulse-width $T_r$ and providing an output of corrected signals having a pulse width $T_b$, said output of said data editing means being connected to said input of said pulse-width correction means;

bit-code error measurement means for detecting unfavorable timing between transmitted and received optical signals, said bit-code error measurement means being connected to said data editing unit for reporting said unfavorable timing; and data output means connected to said bit-code measurement means for output of transmitted data, said second transmitter/receiver unit comprising:

data input means for inputting a data signal in electrical form said data signal having a pulse width $T_b$;

data editing means for reducing a pulse width of said signal received from said data input to generate an output with a pulse width $T_r$ and a reception pause having a width $T_b-T_r$;

optical transmitter means for receiving said signal of a pulse width $T_r$ and generating an optical signal having a pulse width $T_r$;

an optical coupling element for coupling said optical signal of a pulse width $T_r$ to said optical waveguide;

an optical receiver connected to said coupling element, said optical receiver for receiving optical signals of a pulse width $T_r$ and generating electrical signals of a pulse $T_r$;

pulse-width correction means having an input for receiving electrical signals from said optical receiver of a pulse-width $T_r$ and providing an output of corrected signals having a pulse width $T_b$, said output of said data editing means being connected to said input of said pulse-width correction means;

control signal output means receiving said output of said pulse-width correction means and generating a control signal output for varying a time of transmitting a pulse width $T_r$ transmitted from said second transmitter/receiver unit during said reception pause ($T_b-T_r$) received from said first transmitter/receiver unit, said control signal output being applied to said data editing unit; and data output means, connected to said control signal means for output of transmitted data.

2. A device according to claim 1, wherein said first transmitter/receiver unit performs a master function and said second transmitter/receiver unit performs a slave function.

3. A device in accordance with claim 1, wherein:

said pulse width $T_r$ and said reception pause are positioned adjacent each other and the space of said pulse width $T_b$.

4. A device in accordance with claim 1, wherein:

said data editing units receive said unfavorable timing from said bit-code measurement means and combines said data signal with a modify signal indicating said unfavorable timing, said modify signal and said data signal being sent to said second transmitter/receiver unit;

said control signal output means removing said modify signal from said data signal and generating said control signal based on said modify signal.

5. A device in accordance with claim 1, wherein:
said optical transmitter of said first transmitter/receiver propagates a plurality of said pulses $T_r$ along the optical waveguide in a first direction while said optical transmitter of said second transmitter/receiver propagates a plurality of said pulses $T_r$ along the optical waveguide in a second direction;
said optical transmitter of said first transmitter/receiver timing said plurality of pulses $T_r$ to arrive at each respective end of the optical wave guide while said reception pause is being transmitted onto said respective end of said optical waveguide.

6. A method for bidirectional digital communication on a single line, the method comprising the steps of:
receiving a first digital data stream, said first digital data stream including pulses having a pulse width $T_b$;
reducing said pulses of said first digital data stream to reduced pulses having a pulse width $T_r$;
creating a reception pause $(T_b - T_r)$ in a remainder of said original pulse width $T_b$, of said first digital data stream;
transmitting said reduced pulses and said reception pauses of said first digital data stream into a first end of the line along a first direction and at a specific frequency;
receiving a second digital data stream, said second digital data stream including pulses having a pulse width $T_b$;
reducing said pulses of said second digital data stream to reduced pulses having a pulse width $T_r$;
creating a reception pause $(T_b - T_r)$ in a remainder of said original pulse width $T_b$ of said second digital data stream;
transmitting said reduced pulses and said reception pauses of said second digital data stream into a second end of the line along a second direction and at said specific frequency, said reduced pulses of said second digital data stream being transmitted during said reception pause of said first digital data stream.

7. A method in accordance with claim 6, wherein:
said first and second digital data streams are electrical signals;
the line is an optical waveguide;
said reduced pulses and reception pauses of said first and second digital data streams are also electrical signals and are converted into optical signals having said reduced pulse widths $T_r$ and reception pauses $(T_b - T_r)$, said optical signals being transmitted over said optical wave guide.

8. A method in accordance with claim 6, wherein: a ratio of $T_r/(T_b - T_r)$ is less than one (1).

9. A method in accordance with claim 6, wherein:
said transmitting of said reduced pulses of said first and second digital data stream propagates a plurality of said reduced pulses of said first digital data stream along the line in said first direction while a plurality of said reduced pulses of said second digital data stream are propagating along the line in said second direction,
said transmitting of said reduced pulses of said first and second digital data stream timing said plurality of reduced pulses of said first and second data streams to arrive at each respective end of the line while a reception pause is being transmitted onto said respective end of said line.

10. A method in accordance with claim 6, further comprising:
receiving said reduced pulses of said first digital data stream from said second end and expanding said received reduced pulse to said pulse width $T_b$.

11. A method in accordance with claim 10, further comprising:
blocking said receiving of said reduced pulses of said first data stream from said second end of the line during said transmitting of said reduced pulses of said second data stream into said second end of the line.

12. A method in accordance with claim 6, further comprising:
receiving said reduced pulses of said first digital data stream from said second end of said line during a reception pause of said second digital data stream;
creating a modify signal indicating corrections to timing of said reduced pulses of said first digital data stream with respect to said reception pauses of said second digital data stream.

13. A method in accordance with claim 12, wherein:
said modify signal is created at said second end of the line with regard to said reduced pulses received from said second end and said reception pauses transmitted into said second end;
timing of said reduced pulses of said first digital data stream is adjusted at said first end in accordance with said modify signal.

14. A method according to claim 12, wherein a bit error and/or code error evaluation is performed at said second end of the line as a control criterion for said timing corrections of said modify signal.

15. A method according to claim 14, wherein said modify signal is fed in with said second digital data stream at an arbitrary location within said second digital data stream.

16. A method according to claim 15, wherein a specific time slot is provided for the modify signal.

* * * * *